United States Patent [19]

Pierce, Jr.

[11] 4,237,516

[45] Dec. 2, 1980

[54] PROTECTIVE ELECTRICAL DISCHARGE DEVICE

[75] Inventor: Thomas V. Pierce, Jr., Monroeville, Pa.

[73] Assignee: American Standard Inc., Swissvale, Pa.

[21] Appl. No.: 21,522

[22] Filed: Mar. 19, 1979

[51] Int. Cl.³ .................. H02H 9/06

[52] U.S. Cl. .................. 361/127

[58] Field of Search .................. 361/126, 127, 128; 313/231, 231.1, 203

[56] References Cited

U.S. PATENT DOCUMENTS

| | | | |
|---|---|---|---|
| 2,309,183 | 1/1943 | Gilson et al. | 361/127 X |
| 2,415,945 | 2/1947 | Gilson | 361/126 X |
| 2,907,910 | 10/1959 | Marsteller | 361/126 X |
| 2,923,849 | 2/1960 | Rees | 361/126 X |
| 3,204,322 | 9/1965 | Rees | 361/126 X |

*Primary Examiner*—Harry E. Moose, Jr.

*Attorney, Agent, or Firm*—A. G. Williamson, Jr.; R. W. McIntire, Jr.

[57] ABSTRACT

A varistor element is press-fitted into a recess formed in one surface of a metal electrode and protrudes a preselected distance out from the electrode surface. A second metal electrode is positioned in line with but spaced from the varistor by a TEFLON washer of selected thickness to fix the length of the air gap between the varistor and second electrode. The length of the copositioned air gap between the metal electrodes is similarly fixed by the washer and the protruding portion of the varistor. The assembly is held by a central rivet with a spring cup washer positioned under its peened end to hold elements in contact while absorbing some of the discharge force. The rivet is insulated by a nylon tube integral with an open-end cover for the assembly held at the closed end by the rivet head. When a high voltage surge is applied across the arrester assembly, the varistor-to-metal gap ionizes quickly to initiate discharge. Ionization products of the initial discharge, plus the varistor resistance, trigger a shift of the surge discharge to the metal-to-metal gap to protect the varistor from damage by large energy surges.

10 Claims, 3 Drawing Figures

PROTECTIVE ELECTRICAL DISCHARGE DEVICE

BACKGROUND OF THE INVENTION

My invention pertains to a protective electrical discharge device. More specifically, the invention relates to a lightning arrester device for protecting low voltage circuits and/or apparatus against voltage surges, particularly from lightning during electrical storms.

Many low voltage signaling and communication circuit arrangements, and railroad signaling circuits and apparatus in particular, are frequently exposed to hazards such as high voltage surges on input connections resulting from electrical storms. Therefore, to maintain proper and safe operation, these circuits require adequate protection against such high voltage from lightning and other external causes. Protective discharge devices, e.g., lightning arresters, have been used for many years to protect low voltage circuits and apparatus. Various types and materials have been incorporated in designs for both line-to-line and line-to-ground protection paths. The advantages and benefits of using varistors, i.e., non-linear resistors, in surge protection devices have long been recognized. Specifically, in the construction of air gap lightning arresters, the use of a varistor material for one of the pair of arc contacts gives superior performance as compared to metal-to-metal arc contacts, since the grain structure of the varistor facilitates ionization initiation of the air gap. This results in faster ionization and within a narrower potential range than is normally attainable with a metal-to-metal air gap. A major problem in this type of device is the relatively low energy capacity of varistor material which leads to varistor destruction by high surge currents. Thus a design arrangement for a protective electrical discharge device whereby efficient yet economic varistor elements may be used, with destruction of the varistor when a high voltage discharge occurs, is highly desirable.

Accordingly, an object of my invention is an improved protective electrical discharge device incorporating a varistor element.

Another object of the invention is a high voltage protective discharge device using a varistor element as an initial arc contact.

A further object of the invention is an improved lightning arrester employing a varistor-to-metal air gap to initiate discharge with a parallel, back-up metal-to-metal air gap to dissipate the high voltage energy surge to protect the varistor element.

Yet another object of the invention is a lightning arrester including a first air gap between a varistor element and a metal electrode separated by a non-conducting washer, across which an initial surge discharge occurs, and a parallel air gap between that electrode and a second metal electrode, in contact with the varistor, to provide a heavy duty energy surge discharge path as the voltage increases.

Other objects, features, and advantages of the invention will become apparent from the following specification and appended claims, when taken in connection with the accompanying drawings.

SUMMARY OF THE INVENTION

According to the invention, a varistor element of the proper size and shape is press-fitted into a recess formed in one surface of a heavy metal electrode, with a portion protruding from the surface. A second similar metal electrode is assembled in line with the first electrode and varistor combination on a central shaft. This second electrode is spaced from the varistor by a tetrafluorethylene washer to form an air gap with a length fixed by the washer thickness. The washer, together with the protruding portion of the varistor, fixes the length of a second, copositioned air gap between the electrode surfaces. The central shaft is specifically a rivet with a spring cup washer fitted under the peened end to hold the assembly in position under pressure, but with partial absorption of dynamic discharge shocks. The rivet also connects the discharge path through the assembly to external contact terminals and holds in place a nylon cover shielding the assembled elements. This cover includes an integral central sleeve to insulate the rivet from the electrodes and varistor.

When connected as a protection device, i.e., lightning arrester, initial ionization in the air gaps under high voltage application occurs between the varistor element and the second electrode surfaces, due to inherent characteristics of the varistor material, and the initial voltage discharge occurs across this gap. With ionization products present in the copositioned air gaps, the resistance of the varistor element causes the actual discharge to shift to the second or metal-to-metal gap to complete the energy surge dissipation, and thus protects the varistor from damage.

BRIEF DESCRIPTION OF THE DRAWINGS

Prior to defining the invention in the appended claims, I will describe a specific, preferred embodiment as illustrated in the accompanying drawings, in which:

In each of the drawing figures, similar reference characters designate the same or similar parts of the apparatus.

DESCRIPTION OF THE ILLUSTRATED EMBODIMENT

Figure 1A:
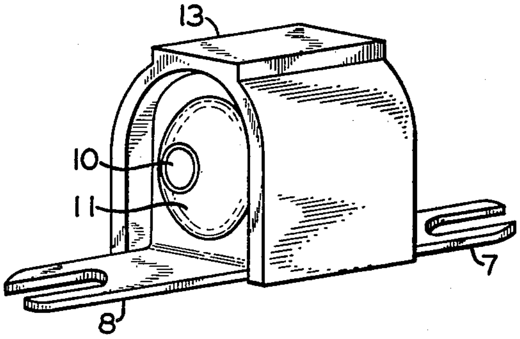
FIG. 1A is a perspective view of the protective device or lightning arrester provided by the invention looking toward the open end of the dust and moisture cover.
Figure 1B:
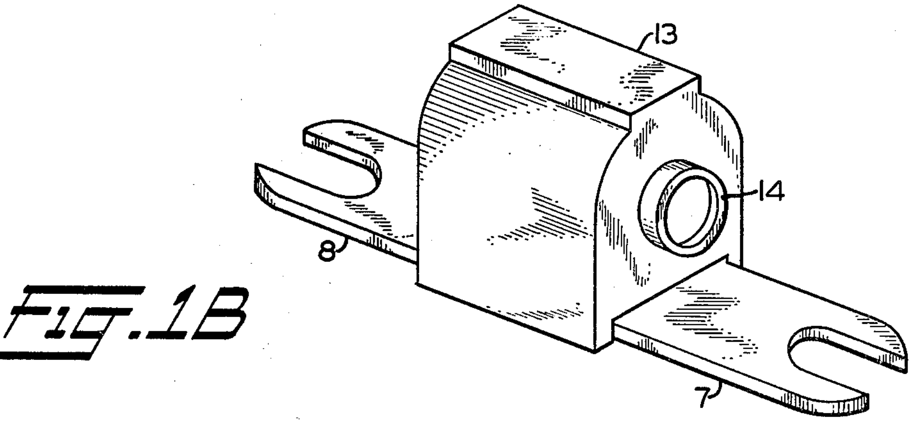
FIG. 1B is a similar perspective view of the lightning arrester looking toward the closed end of the cover.

Referring to FIGS. 1A and 1B, general perspective views are shown (not necessarily to the same scale) of the preferred form of the protective electrical discharge device, commonly a lightning arrester, provided by the invention. The specific details of the invention are not shown in these two views, but will be described in connection with FIG. 2. To be noted are the external connectors or bus terminal bars 7 and 8, which are designed for mounting the device in a standard terminal block in a manner shown in FIGS. 1 and 2 of the U.S. Pat. No. 2,907,910, issued Oct. 6, 1959, to L. O. Marsteller. The dust and moisture cover 13 is shown as closed at one end (FIG. 1B) and open at the other end (FIG. 1A) to allow the escape of gas and particles resulting from a surge discharge.

Figure 2:
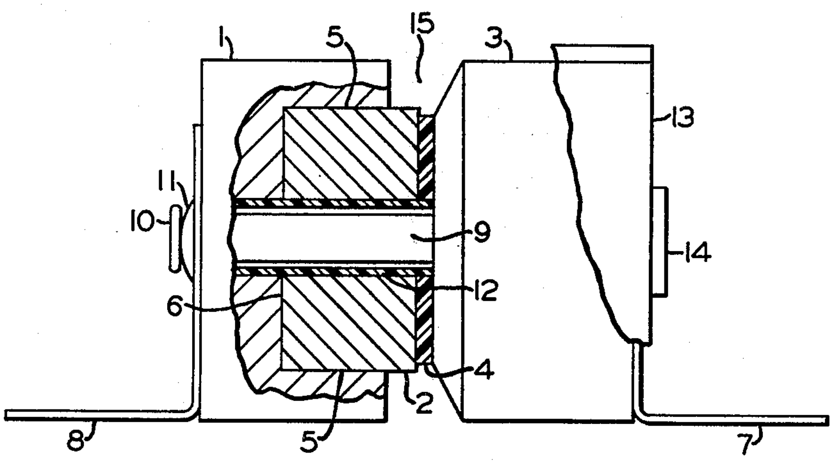
FIG. 2 is a schematic view, partly in cross-section, of the side elevation of the lightning arrester embodying the invention.

Referring to FIG. 2, the major elements of the disclosed device are the heavy metal electrodes 1 and 3, e.g., brass, and a block of varistor material 2 of selected voltage characteristic. Preferably, these three items are of cylincrical form. A recess, outlined by walls 5 and 6, and into which varistor 2 is inserted, is formed in one surface of electrode 1. It is to be noted that varistor 2 protrudes out a selected distance from the surface of electrode 1. Electrode 3 is assembled in line with the varistor 2, electrode 1 combination but is separated, or insulated, from the varistor by a non-conducting washer 4. The thickness of this washer establishes the predetermined length of an air gap between the outer surface of varistor 2 and the adjacent surface of electrode 3. Preferably, washer 4 is made of a tetrafluorethylene material sold under the trademark TEFLON. Washer 4 and the protruding portion of varistor 2 fix a predetermined length for air gap 15 between electrodes 1 and 3. The lengths of these copositioned air gaps establishes the voltage rating of the lightning arrester. It is to be noted that the inner surface of electrode 3 in the air gap slopes away from electrode 1.

The varistor cylinder is oversized with respect to the recess in electrode 1 so that assembly must be accomplished by pressing the varistor into the opening under high pressure. This assembly method results in a small amount of the brass metal along the recess walls, reference 5, being sheared off and deposited within the grain of the varistor material. This result, being the equivalent of metallizing the varistor surface, yields excellent electrical contact along the sides of the varistor disc. Good electrical contact is also made on the face 6 of the varistor disc due to the high pressure of assembly.

Elements 1 to 4 are drilled for mounting on and to be held in place by a central rod, specifically the rivet 9, which also connects the assembly to external contacts 7 and 8. This rivent has its peened end, reference 10, formed against a spring cup washer 11, such that assembly pressure is maintained while permitting the partial absorption of dynamic loads resulting from large surge currents. The body of the rivet is insulated from the contact assembly by a nylon tube 12, which is an integral part of a nylon cover 13. This cover, shown only partially in this view, is held firmly to the entire assembly by the rivet head 14 seated in a recessed boss. This mounting is better illustrated in the perspective views. A nylon cover has desirable properties in that it absorbs large dynamic loads without shattering and does not readily support combustion. As shown in FIG. 1A, cover 13 is open at one end (left in FIG. 2) to permit the escape of gas and particles produced during voltage discharges.

In operatiion, the varistor-to-metal gap ionizes relatively fast and within a narrow range of impressed voltages. The actual voltage range is determined, and is thus preselected, by the thickness of washer 4. Once ionizaton products are present in the gap 15 area, the resistance of the varistor causes the surge current to shunt to the metal-to-metal gap, thus protecting the varistor from too high an energy surge. The surface of electrode 3 is sloped in order to ensure a fairly constant gap distance between it and the varistor as the metal erodes under heavy surge currents. Additionally, the TEFLON washer 4 has the property that it melts away, without contamination, at a rate approximately equal to the erosion rate of the brass contact. In this manner, an unblocked, constant air gap is maintained.

The described lightning arrester thus provides the benefits of employing a varistor-to-metal discharge gap while protecting the varistor from damage or destruction by very large energy surges. The disclosed device comprises component parts arranged in such a manner as to utilize the varistor-to-metal gap during the first portion of a surge, which is the period during which the faster ionization time and the narrower ionization range are of greatest benefit. During the remainder of the surge, the heavy duty metal-to-metal gap is utilized, thus shunting the bulk of the surge energy away from the relatively delicate varistor. An efficient and effective high voltage surge protection device is thus provided in an economical manner.

Although I have herein shown and described one form of high voltage lightning arrester embodying the invention, it is to be understood that various changes and modifications therein, within the scope of the appended claims, may be made without departing from the spirit and scope of my invention.

Having now described the invention what I claim as new and desire to secure by Letters Patent, is:

1. A protective electrical discharge device comprising, (a) a first electrode means bored for mounting on a central shaft and comprising a varistor element fitted into one surface of a metallic block,
  (1) said varistor element protruding a preselected distance from and surrounded by that one surface,
(b) a second metallic electrode means also bored for mounting on a central shaft with one surface facing said one surface of said first electrode means with said varistor insert,
(c) a non-conducting washer, bored for mounting on a central shaft, inserted between said one surface of said second electrode means and the protruding varistor portion of said first electrode means for creating a first air gap between said varistor element and second electrode,
  (1) said washer and protruding varistor portion creating a second and copositioned air gap between the second electrode one surface and the surface of said metallic block surrounding said varistor protrusion,
(d) a retainer shaft means inserted through the bored elements for holding the assembly of said first and second electrode means and said washer firmly in position, and
(e) a pair of terminals, one connected to the outer surface of said first and second electrode means by said retainer shaft means for completing a discharge path, over which a high voltage applied to said terminals is dissipated by an initial discharge across said first air gap which actuates a subsequent discharge across said second air gap to dissipate the major portion of the high energy surge and protect the varistor from damage.

2. A protective discharge device, as defined in claim 1, in which, (a) said first and second electrode means have cylindrical form, with the metallic blocks having equal diameters,
(b) said varistor element also has a cylindrical form with a diameter less than that of the block into which inserted,
(c) said washer has a disk form with a diameter slightly less than said varistor element, and
(d) the one surface of said second electrode means within said copositioned air gaps slopes away from said one surface of said first electrode metallic block for maintaining a substantially constant air gap between the second electrode surface and said varistor as wear occurs.

3. A protective discharge device, as defined in claim 2, in which, (a) said retainer shaft includes an insulated rivet and spring cup washer, (b) said rivet is inserted through said assembly, the rivet head holding one terminal in contact with the electrode outer surface at one end, the other end of said rivet peened to secure said assembly in position, and (c) said spring cup washer is inserted under said peened rivet end for maintaining firm contact between the other terminal and the other electrode outer surface and between the elements of said assembly, said washer also absorbing a portion of the dynamic shock of surge discharges.

4. A protective discharge device, as defined in claim 3, in which, said washer element is formed from tetrafluorethylene material.

5. A protective discharge device, as defined in claim 4, which further includes, (a) a nonflammable, shock resistant, insulating cover device, open at one end, shaped to fit over said cylindrical assembly, and held by said rivet head for protecting said assembly from dust and moisture, said open end allowing the escape of surge discharge products from the enclosure, and (b) a central tube integral with said cover for insulating said rivet from said assembly and at least one terminal.

6. A protective discharge device, as defined in claim 5, in which said cover and integral insulating tube are formed of nylon material.

7. A lightning arrester comprising, (a) a first metallic electrode with a recess formed in one surface, (b) a varistor element sized for press-fitting into said first electrode recess and protruding a preselected distance from the electrode surface, (c) a second metallic electrode positioned in line with said first electrode and varistor combination, (d) a tetrafluorethylene washer positioned between said second electrode and said varistor for creating a first varistor-to-metal air gap, (1) said washer and the preselected protruding portion of said varistor creating a second and copositioned metal-to-metal air gap between said first and second electrodes, (e) an insulated rivet and spring means inserted for holding the electrode, varistor, and washer assembly in firm contact, and (f) a pair of contact terminals, one connected by said rivet and spring means to each outer electrode surface in said assembly for completing a discharge circuit path between said terminals, whereby the application of a high voltage potential to said terminals causes an initial discharge across said first air gap and subsequent discharge across said second air gap.

8. A lightning arrester, as defined in claim 7, in which, (a) said electrodes and said varistor element each have a cylindrical form, the varistor element diameter being less than the equal diameters of said electrodes, (b) said washer has a disk form with a diameter slightly less than the diameter of said varistor element.

9. A lightning arrester, as defined in claim 8, which further includes, (a) a non-conducting shield held in place by said rivet means and shaped to cover said assembly for protecting against dirt and moisture, said shield open at one end to allow escape of the products of voltage surge discharge, (b) said shield including an integral central sleeve for insulating said rivet means from said electrode and varistor assembly.

10. A lightning arrester, as defined in claim 9, in which said shield and integral central sleeve are formed of nylon.

* * * * *